E. R. HOBBS.
ROTARY VALVE GEAR.
APPLICATION FILED DEC. 29, 1915.
1,295,165.
Patented Feb. 25, 1919.
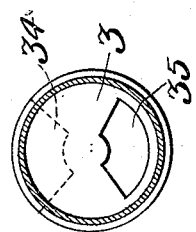
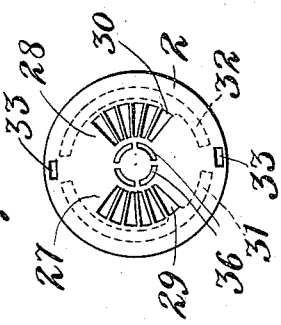
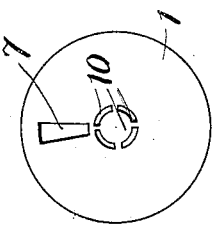
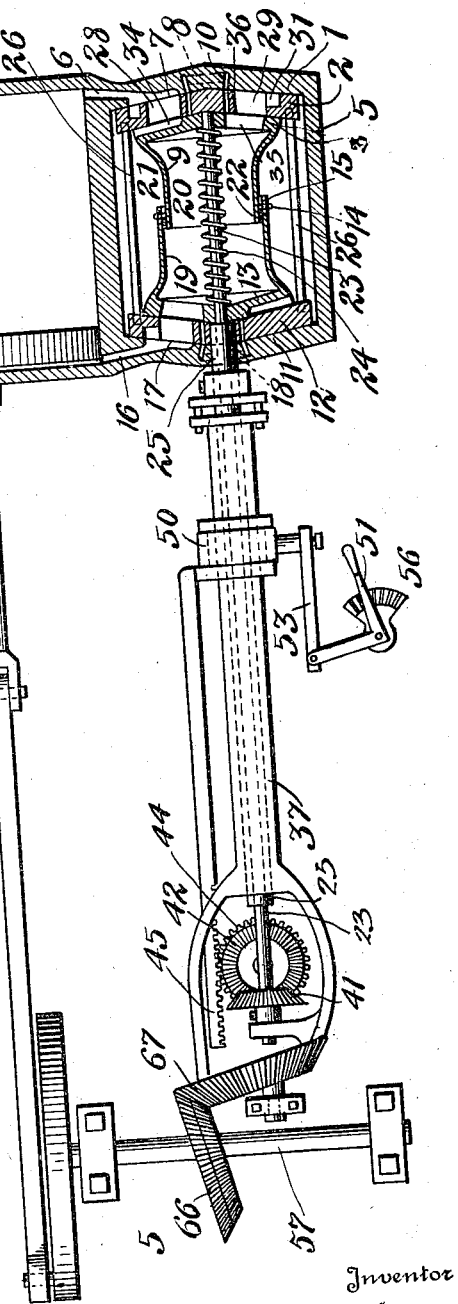
Inventor
Elbert R. Hobbs
By Edward E. Clement
Attorney

UNITED STATES PATENT OFFICE.

ELBERT R. HOBBS, OF BUHL, IDAHO.

ROTARY-VALVE GEAR.

1,295,165.	Specification of Letters Patent.	Patented Feb. 25, 1919.

Application filed December 29, 1915. Serial No. 69,169.

*To all whom it may concern:*

Be it known that I, ELBERT R. HOBBS, a citizen of the United States, residing at Buhl, in the county of Twin Falls and State of Idaho, have invented certain new and useful Improvements in Rotary-Valve Gears, of which the following is a specification, reference being had therein to the accompanying drawing.

My invention relates to valve gears for fluid engines and more particularly to rotary valves and a system of control therefor.

An object of my invention is to provide a double acting balanced valve structure making use of the type of valve described in Letters Patent No. 1,137,758 granted to me May 4, 1915.

Another object of my invention is to provide a system of rotary valve control whereby fluid may be let into either side of the engine cylinder at the same rate and in the same quantity.

Further objects of my invention are to provide novel arrangements and combinations of parts whereby various new and better results may be obtained in the art to which it pertains.

My invention is illustrated in the accompanying drawings in which—

Figure 1 is a plan view, partly in section, of a fluid engine equipped with my invention.

Fig. 2 is a plan view of the valve seat.

Fig. 3 is a plan view of the intermediate valve member looking from within the steam chest.

Fig. 4 is a plan view, partly in section, of the cap valve member, looking from within the steam chest.

Referring to the drawings in particular, 4 is the engine cylinder, adjoining which is a cylindrical steam chest 5 whose interior is connected through short steam ducts 6 and 16 leading from opposite ends of the steam chest to the respective opposite ends of the cylinder. The ducts 6 and 16 terminate in the steam chest in openings 7 and 17 in the valve seats 1 and 11 respectively. Intermediate valve members 2 and 12 engage the valve seats 1 and 11 and are in turn engaged by the cap members 3 and 13, respectively. The cap members 3 and 13 are connected to each other by cylindrical telescoping extensions 9 and 19, held in fixed angular relation by means of pins 14 fixed in the extension 9 and engaging longitudinal slots 15 in the extension 19. These telescoping sections inclose an exhaust space 20 within the steam space 21 and are provided with an annular packing 22 interposed at the sliding joint in order to prevent the leakage of steam between the spaces 20 and 21. The cap members 3 and 13 are rotated by means of the shaft 23 which passes through the member 13 and is fixed to the member 3. This shaft carries a coiled compression spring 24 adapted to bear against 3 and 13 and hold them against the intermediate valve members 2 and 12. The intermediate member 12 is rotated by the hollow shaft 25 to which it is fixed, and carries with it the other intermediate member 2 by means of the rigid arms 26 fixed to the member 12 and slidably engaging the member 2. This slidable engagement of the pairs of members 2—12 and 3—13 is provided in order to permit the members of each pair to move away from each other to take up the wear.

The valve members 1—11, 2—12 and 3—13 coöperate in the same manner as those described in the patent previously referred to and differ only in form to adapt them to the arrangement here used. As the members 1, 2 and 3 are substantially like the members 11, 12 and 13, respectively, a description of one set, 1, 2 and 3, will suffice. The engaging or bearing surfaces of the several valve members are made conical in shape in order to keep them in alinement. A single radial opening 7 in the valve seat 1 connects with the steam duct 6 while a series of arc-shaped openings 10 near the center of the valve seat lead to an annular exhaust duct 8 connected with the atmosphere or a condenser through a suitable passage not shown. In the intermediate member 2 is a series of arc-shaped perforations 36 registering with the openings 10, and on opposite sides of the center are groups of radial perforations 27 and 28, an end perforation 29 and 30 in each group communicating with an arc-shaped recess 31 and 32, respectively, which recesses open only on the face engaging the valve seat 1 and are separated from each other at the ends a distance slightly greater than the width of the opening 7. Sockets 33 are formed in the member 2 near its periphery to engage the rigid arms 26, previously referred to, which sockets have their side walls parallel to the axis of rotation of the valve so as to permit axial movement between the valve and the arms while maintaining a constant angular relation. The cap member 3 is formed with a recess 34 and a perforation 35 each adapted to communicate with one or more of the perforations in the groups 27 and 28 in the intermediate member, according to the relative angular position of the two members, the perforation 35 communicating at all times with the perforations 36. The spaces formed by the perforations and recesses in the different members 1, 2 and 3 are so arranged and proportioned that when the members are superposed in the relative angular positions shown in Figs. 1, 2 and 3, the recess 34 and perforation 35 will be out of connection with the perforations 27 and 28, and the perforations 27 and 28 and recesses 31 and 32 out of connection with the opening 7. Thus, in this position, there is no passage of communication between the valve members excepting through the perforations 10, 36 and 35 which form the exhaust passage. However, if the cap member 3 is rotated in a clockwise direction, the recess 34 will be brought into communication with one or several of the perforations of group 28, according to the amount of rotation, while the perforation 35 will be brought into communication with the same number of perforations in the group 27 and with the recess 31 via the perforation 29. It will be seen that by varying this adjustment, the amount of steam admitted to the cylinder through the opening 7 at each counterclockwise revolution of the members 2 and 3, as a whole, may be varied.

Relative rotation of the cap and intermediate member is effected by means of the concentric shafts 23 and 25 which are normally rotated as a whole with a cylindrical casing 37, motion being transmitted to the casing 37 through the bevel gears 66 and 67 from the engine shaft. The concentric shafts 23 and 25 are arranged to be rotated or adjusted in relation to each other, during their rotation as a whole, by means of the lever 51. Motion is transmitted from the lever 51 through the link 53, a slip ring 50, rack 45, gear 44, bevel gears 42—41 to the solid shaft 23. The handle 51 may be locked in any adjusted position by means of the lock plate 56.

The operation of an engine making use of the type of valve shown herein is set out in detail in the patent previously referred to, and it suffices here to describe a complete cycle of a charge of steam through one side of the engine cylinder, the cycle of the charge through the other side being identically the same.

Assuming that the intermediate valve member 2 is adjusted so that the inlet recess 34 is in communication with several of the perforations 28, and the exhaust perforation 35 in communication with the recess 31 via the perforation 29, and also that the space 21 in the steam chest is connected with a suitable source of steam supply not shown; the steam will first pass from the space 21 through recess 34, the first one of the perforations 28, opening 7, steam duct 6, into the cylinder 4 back of the piston. As the piston moves forward, the steam continues to enter the cylinder over the path described through successive perforations 28. As the piston nears the end of the forward stroke, the flow of steam is cut off by the movement of the perforations 28 out of communication with the opening 7. At the beginning of the back stroke, the recess 31 is brought into communication with the opening 7 so that during the entire back stroke the exhaust steam will pass out to atmosphere or condenser via duct 6, opening 7, recess 31, perforation 29, exhaust chamber 20 and perforations 36 and 10.

Having thus described my invention what I claim and desire to secure by Letters Patent is:

1. A double rotary valve comprising two sets of valve members each set comprising a valve seat, an intermediate valve member and a cap member superposed one upon the other, the valve seats of opposite sets forming opposite walls of a steam chest, the cap members of opposite sets forming opposite walls of an exhaust chamber, the intermediate valve members of each set being interposed between the adjacent said opposite walls, and the said valve seat cap member and intermediate member of each set being formed into nested cones to act as a thrust bearing for the valve.

2. A valve comprising a steam chest having coaxial conical valve seats in the inner faces of opposite walls thereof, each of said valve seats having openings therein, an intermediate valve member coöperating with each of said valve seats having an outer conical face complementary to and engaging its associated valve seat and an inner conical face presented inwardly of the steam chest, said intermediate member being provided with passages extending between the two faces, valve cap members having conical faces complementary to and engaging the inner faces of said intermediate members and forming the end walls of a hollow telescoping cylinder, each of said cap members having a passage therein communicating with the inner space of said cylinder and said inner face of its associated intermediate member, and another passage therein isolated from said first passage and communicating with the inner space of said steam chest and the said inner face of its associated intermediate member, all of said cylindrical faces and valve seats being coaxial, means for rotating all said intermediate and cap members as a whole, means for maintaining said intermediate members in fixed angular relation to each other while permitting relative axial movement; means for maintaining said cap members in fixed angular relation to each other while permitting relative axial movement, means for maintaining each intermediate member in engagement with its associated valve seat and each cap member in engagement with its associated intermediate member under pressure and means for rotating said intermediate members and said cap members in relation to each other.

3. In a fluid engine having a pressure driven member inclosed in a working chamber, a steam chest or fluid pressure chamber having ports communicating with the working chamber, opposite conical valve seats in said chest, rotary valve members having opposite conical portions engaging said seats and perforated at proper points to form coöperating ports, said engaging conical portions and seats constituting thrust bearings for said valve members and the sealing joints for said steam chest, and tensioning means operable independently of steam pressure on the valve members tending to thrust said rotary valve members apart and into engagement with their respective seats.

In testimony whereof I affix my signature in presence of two witnesses.

ELBERT R. HOBBS.

Witnesses:
GEO. W. HOOVER,
GEO. R. VOSBURG.

Copies of this patent may be obtained for five cents each, by addressing the "Commissioner of Patents, Washington, D. C."